July 30, 1935. C. E. BOWERS Re. 19,657

DOLL

Original Filed July 19, 1934 2 Sheets-Sheet 1

INVENTOR
CECILIA E. BOWERS
BY
her ATTORNEY

July 30, 1935. C. E. BOWERS Re. 19,657

DOLL

Original Filed July 19, 1934 2 Sheets-Sheet 2

INVENTOR
CECILIA E. BOWERS
BY
her ATTORNEY

Reissued July 30, 1935

Re. 19,657

UNITED STATES PATENT OFFICE 19,657

DOLL

Cecilia E. Bowers, Washington, D. C.

Original No. 1,978,337, dated October 23, 1934, Serial No. 735,933, July 19, 1934. Application for reissue May 28, 1935, Serial No. 23,954

15 Claims. (Cl. 46—40)

The invention relates to dolls and has for its object to provide a novel doll capable of changes in its facial expression by the intervention of mechanism which is easy although positive in its operation.

In the drawings which show the invention in structural embodiment.

It is well known that in practice changes in the facial expression from normal to smiling, crying, or frowning call into play the action of various muscles, which work in harmony; thus when a face is smiling the cheeks are usually moved outwardly and upwardly so as to stretch both corners of the mouth, and the lower lip is moved downwardly, opening the mouth more or less, displaying the upper teeth only, or both the upper and lower teeth, according to whether the person is only smiling or laughing heartily.

For a life-like reproduction of a smile, these various movements should be combined into a composite movement in the mouth region, involving, upward stretching of the lips at the mouth corners and parting of the lips; and since the mechanism is to be operated by a child, it is naturally desirable that the same be controlled by an extremely simple manipulation, preferably by actuating means extending into the torso of the doll and controlled by pressure thereon.

For the control of the mechanism, I prefer to resort to the simple, well-known and practically instinctive pressing of the abdominal portion of the doll's body, which is generally resorted to for actuating a sound device, such as is enclosed in the body of so-called talking dolls. It is obvious, however, that if desired, the mechanism can be actuated in some other manner.

Figure 1:
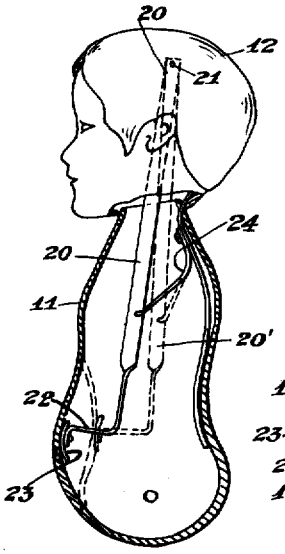
Figure 1 is a side view, partly sectioned, of the upper portion of the body of one type of doll, embodying my invention.

In Fig. 1 of the drawings, I illustrate the upper portion of the body of a doll, embodying my invention, in which 11 designates the torso, which is hollow, and is made of some suitable resilient material, such as rubber, and 12 designates the head, which is secured to said torso in a preferably fixed relation.

Figure 2:
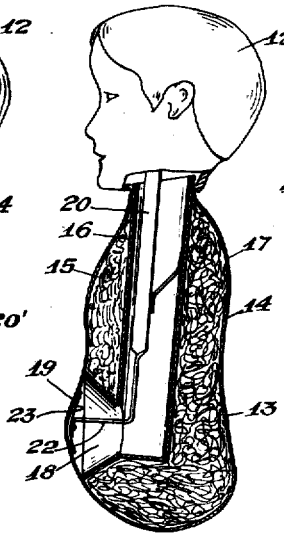
Fig. 2 is a similar view, illustrating a modified construction of the body portion of the doll.

In Fig. 2 the torso 13 is shown as being composed of a covering 14, which may be a fabric or like material and a filling, 15, of horsehair, kapok, sawdust, or any other suitable material, adapted to impart to the body structure the softness and yet the substance which best reproduces the "feel" of the human body.

The hollow central portion of said torso is isolated by walls, such as 16, which may be of strong fabric or any other suitable material, to provide a vertically extending chamber 17, opening at the top within the neck portion of the head and deflected at the lower end, as shown at 18, towards the front of the body, preferably in registry with the abdomen, where it is concealed by part 19 of the flexible covering 14.

Thus in the case of both alternative structures of Figs. 1 and 2, the construction is such that the abdominal portion of the torso is depressible manually. The pressure exerted by the hand on the depressible portion of the torso is employed to operate the actuating means for the pushing lever mechanism, hereinafter described, which effects the changes in expression of the face of the doll. In the form shown, the actuating means is constituted of an actuating lever 20, pivotally suspended from the interior of the head, as shown at 21, and having its lower end bent forwardly, as shown at 22, and connected to the flexible abdominal portion, as shown at 23. When pressure is applied against the said depressible abdominal portion, the actuating lever 20 will be swung rearwardly about its pivot 21 against the action of a spring 24 to the position shown in dotted lines at 20' in Fig. 1. On releasing the pressure from the depressible portion of the torso, the spring 24 will restore the actuating lever 20 to normal position.

The pushing lever mechanism for changing the facial expression of the doll is located within the head, which, as stated, is hollow and which comprises a rigid foundation 25, made of any suitable material, such as hard rubber or molded composition, or the like, and a flexible or elastic covering 26, preferably made of rubber, and closely surrounding the foundation member. It is to be understood that said elastic cover provides the exterior of the face and skull and is, therefore, painted and formed to present as life-like reproduction of a human head as possible.

The head is inserted over the contracted neck portion 27 of the body and may be cemented or connected thereto in any suitable manner. The foundation portion of the head is preferably formed of a main front portion 25, open at the rear, and a supplementary rear skull portion 25′, registering therewith along line 25″, completing the head structure; said construction providing access to the interior of part 25 for mounting and assembling the various parts of the mechanism before part 25′ is cemented or otherwise secured in position.

If desired, the elastic covering 26 may be cemented onto the surface of the foundation 25—25′ over practically the entire surface thereof, with the exception of that portion of the face which surrounds the mouth, and which may be caused to move with respect to the foundation, in order to produce the desired facial expressions.

Figure 10:
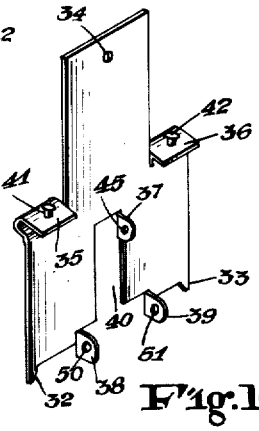
Fig. 10 is a detail view in perspective of a plate which may be used as a pivotal support for various parts of the operating mechanism.
Figure 5:
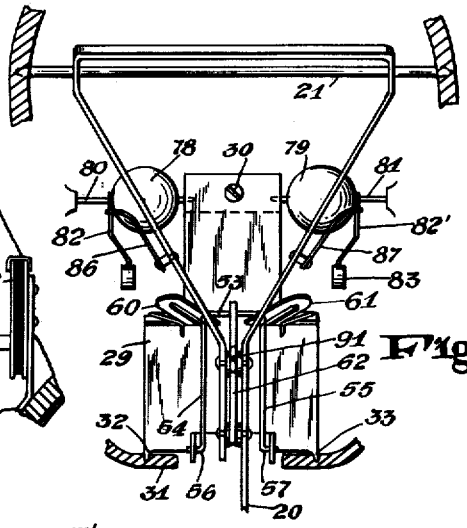
Fig. 5 is a fragmentary vertical cross section through line 5—5 of Fig. 3.

In order to provide a support for various parts of the pushing lever mechanism, foundation member 25 is formed with a lug 28, rearwardly extending between the eye-sockets, and a plate 29 is secured to said lug by means of a screw, such as 30, so as to downwardly extend therefrom to the chin portion, where it is anchored by means of prongs, such as 32, 33, biting into the body of the foundation member, as shown in Figs. 5 and 10.

Said plate 29 is shown in perspective in Fig. 10, where it is seen that said plate is provided at the upper end with an opening, 34, for screw 30, and at a lower level, about corresponding to a level slightly above the line of cleavage of the mouth, with two rearwardly extending lugs 35, 36, laterally spaced, one at each side of the central line of the plate. Furthermore, at a somewhat lower level, about corresponding to the level immediately below the line of cleavage of the mouth, said plate is formed with a rearwardly extending lug 37, and at the lower end with two laterally spaced rearwardly extending lugs 38, 39, one at each side of the central line of the plate. The lower portion of the plate from lug 37 down is preferably formed with a vertical slot, such as shown at 40.

The lugs 35, 36 are provided with pins or studs, 41, 42, serving as pivots for Z-shaped pushing levers, 43, 44, which are capable of angular movement about said pivots, both in a vertical and a transversal sense, as will be later explained. Lug 37 is provided with an opening 45, through which is inserted a pin 46, serving as a pivotal support for a pushing lever 47, in the form of a crank lever having a downwardly extending arm 48 and a forwardly extending arm 49. Lugs 38, 39 are provided with openings 50, 51, respectively, which are the pivotal points of an inverted U-shaped link 52, having an upper horizontal tract 53 and two downwardly extending legs 54, 55, said legs having their lower ends bent, as shown at 56, 57, and inserted within openings 50, 51, respectively.

The link 52, at the upper ends of its legs 54, 55, adjacent to the horizontal tract 53, is slidably inserted through the rearwardly divergent slots 58, 59, provided respectively in the rearwardly divergent arms 60, 61, of the Z-shaped pushing levers 44, 43. At about its center, the horizontal tract 53 of the inverted U-shaped link 52 is pivotally connected to the upper end of a link 62, which is inclined rearwardly and downwardly and is pivoted at its lower end, as shown at 63 to the actuating lever 20. The pivotal point 63 is located at a level considerably below that of the studs 41, 42, constituting the pivots of the Z-shaped pushing levers 43, 44.

Figure 6:
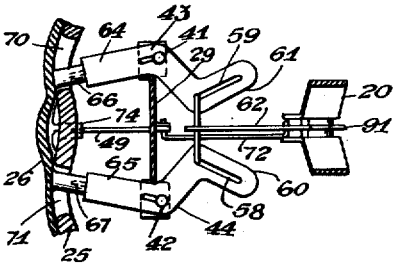
Fig. 6 is a fragmentary horizontal section through line 6—6 of Fig. 3.
Figure 8:
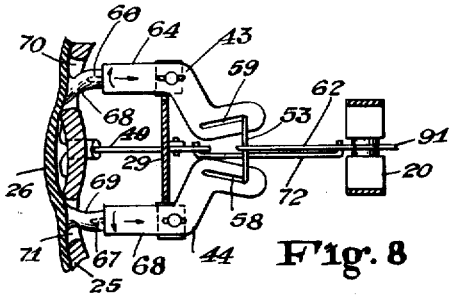
Fig. 8 is a fragmentary horizontal section through line 8—8 of Fig. 4.

The said Z-shaped pushing levers 43, 44, are respectively provided with forwardly extending arms, 64, 65, having at their front ends prongs 66, 67, as shown in dotted lines in Figs. 6 and 8.

Figure 7:
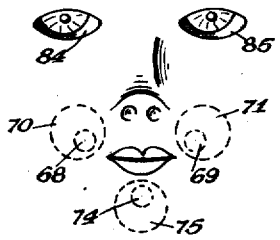
Fig. 7 is a fragmentary front view of the part of the doll's face, showing the mouth in the normal closed condition, which obtains when the various parts of the operating mechanism are at rest, as shown in Figs. 3 and 6.

These pushing levers, 43, 44, terminate in spaced relation to the freely elastic portion of the face covering but they are positively connected therewith, for example, by a permanent connection involving prongs, 66, 67, which are respectively inserted into the rear ends of corresponding lugs 68, 69, projecting inwardly from the rear surface of the freely elastic portion. According to the illustrative embodiment of the invention, the lugs, 68, 69, are preferably made of elastic material, such as rubber, corresponding with the material of the face covering, so as to grip firmly the prongs 66, 67, of the pushing levers and to afford resilient or yielding connections between the levers and the elastic face covering. The lugs are firmly united with the face covering, for example, by vulcanization, or by making them integral with the covering. As shown in Fig. 7, the lugs, 68, 69, are located at the opposite corners of the mouth just beyond the junctures of the lips and above the line of cleavage of the mouth, and respectively project inwardly through openings 70, 71, in the foundation member. These openings, 70, 71, are large enough in size, or area, to accommodate the movements of the lugs, 68, 69, when operated by the pushing levers 43, 44, in the manner presently to be described.

Figure 3:
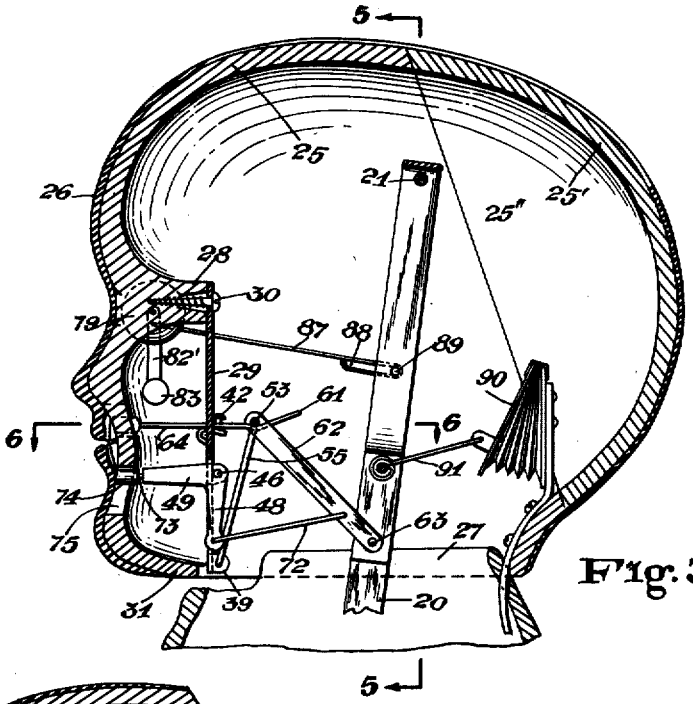
Fig. 3 is a vertical section in an enlarged scale, through the head portion of the doll, illustrating the mechanism controlling the facial expressions thereof, at rest.
Figure 4:
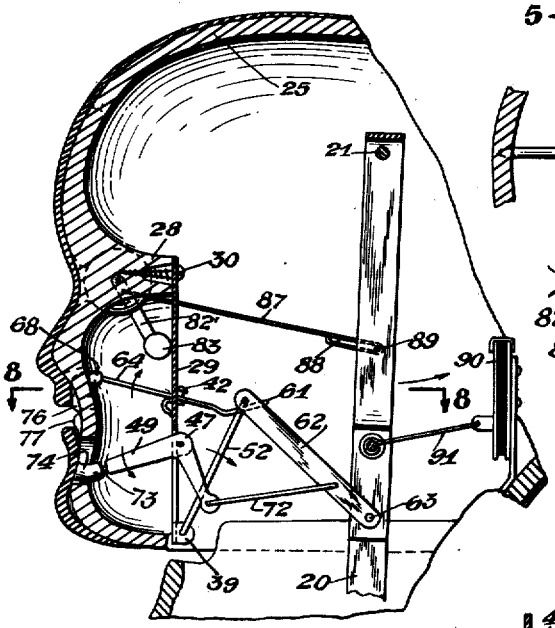
Fig. 4 is a similar view, with parts broken away, illustrating the same mechanism when pressure is exerted against the actuating lever thereof.

When lever 20 is swung rearwardly from the position shown in Fig. 3 to the position shown in Fig. 4, link 62 will cause rearward swinging movement of link 52 about its lower pivotal support, so that the upper ends of legs 54, 55, riding through slots 58, 59 from the position shown in Fig. 6 to the position shown in Fig. 8 will cause the front arms 64, 65, of the Z-shaped pushing levers 43, 44 to spread outwardly.

At the same time, the rearward swinging movement of link 52 from the position shown in Fig. 3 to the pronouncedly inclined position shown in Fig. 4, will cause Z-shaped levers 43, 44, to tilt vertically about their pivots 41, 42, in a clockwise direction as viewed in Figs. 3 and 4, so that the front ends of arms 64, 65, of said levers will be raised, for example from the position shown in Fig. 3 to the position shown in Fig. 4.

Figure 9:
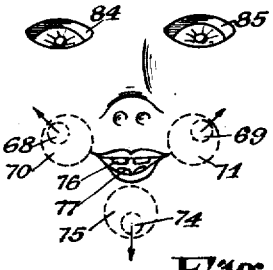
Fig. 9 is a view similar to Fig. 7, showing the mouth in the smiling condition, which results from the operation of the mechanism illustrated in Figs. 4 and 8.

By virtue of the above described operation of the pushing levers 43, 44, the composite pushing movements, both laterally and vertically, imparted to the lugs 68, 69, by the arms 64, 65, of said pushing levers, will result in said lugs 68, 69, being laterally deflected and moved in upwardly divergent diagonals with respect to the line of cleavage of the mouth, for example, from the position shown in Fig. 7 to the position shown in Fig. 9. In consequence, like pushing movements will be imparted at the mouth corners of the elastic portion of the face covering, so that the portion of the covering surrounding the mouth will be stretched upwardly from the opposite junctures of the lips, the upper lip will be elevated, and a general expansive movement will occur in the elastic portion surrounding the mouth, all of which is in simulation of the muscular action of the human face in smiling.

The resilient or yielding connections between the pushing levers and the elastic portion of the face covering are a material factor in obtaining a natural facial expression, for, instead of causing abrupt deformations in localized areas of the elastic portion as would result if the levers directly cooperated with the latter, they enable the elastic portion to adjust itself evenly and smoothly into an expanded position.

According to the illustrative embodiment of the invention, the above described movements at the opposite corners of the mouth region of said elastic face covering occur in harmony with a pushing movement lowering the lower lip which heightens the versimilitude of the smiling expression imparted to the face of the doll. The downwardly extending arm 48 of crank lever 47 is pivotally connected to link 62 by another link 72, which, when lever 20 is swung rearwardly to the position shown in Fig. 4, will cause angular movement of crank lever 47, in a counterclockwise direction, with respect to Figs. 3 and 4, so that the front end of its frontwardly extending arm 49 will be moved downwardly from the position shown in Fig. 3 to the position shown in Fig. 4.

The forward end of arm 49 of said crank lever 47 is also positively connected with the elastic portion of the face covering, and, as shown, is provided with the permanent connection, involving, a prong 73, which projects into a rearwardly-extending lug 74, supported by the freely flexible portion of the face covering, below the line of cleavage of the mouth and in the middle part of the lower lip. Preferably, the lug 74 is made like the lugs 68, 69, hereinbefore described and is supported similarly by the lower lip. The lug 74 projects through an opening 75, in the foundation member 25, of the proper size or area to accommodate the pushing movement of the lug under the action of the crank lever 47. When the forward arm of the crank lever 47 moves downwardly in harmony with the above described movements of the Z-shaped levers 43, 44, the lower lip of the doll's face is forced downwardly, disclosing the upper and lower teeth 76, 77, which are provided on the foundation member 25 behind the lips. The lowering of the lower lip, in combination with the upward stretching of the mouth at the corners and the lifting of the upper lip, constitute a composite movement of the freely elastic portion of the face covering 26, which gives a lifelike illusion of an animated smile. By changing the points of connection of the pushing levers to the elastic portion of the covering 26, the capability of the doll for change in facial expression may be modified, for example, to produce other expressions, as frowning or crying.

The feature of reproducing facial expressions just described may be combined with other features as are frequently provided in talking or mechanical dolls.

Thus, the foundation member 25 is provided with eye-sockets, within which are pivotally mounted eyeballs, 78, 79, adapted to move about horizontal pivots 80, 81, and equipped with downwardly extending levers 82, 82', each provided at the lower end with a weight, such as 83. The facial covering is correspondingly provided with openings 84, 85, through which the eyes will show, so that when the doll stands upright the eyes will be open and when the doll is laid down in a horizontal position the eyes will close, simulating sleep in the well-known manner. If desired, the swinging movement of lever 20 can also be utilized for causing a slight movement of the eyes, in order to enhance the effect of animation; for instance, said lever 20 may be connected to downwardly extending arms 82, 82', by links such as 86, 87, which will cause a slight downward movement of the eyes when lever 20 is forced rearwardly. The connection between lever 20 and links 86, 87, is preferably such as to permit the movement of the eyes from open to closed to take place unhampered and independently of lever 20 when the doll is placed in a horizontal position. The result can be obtained either by making the links 86, 87, of flexible material or else by forming the rear end of each link to provide an elongated slot, such as shown at 88 in Figs. 3 and 4, which allows the necessary lost motion with respect to connecting pin 89, when the eyes are tilted by gravity to the closed position.

In order to further enhance the illusion of life, I prefer to also equip the doll with some suitable sound-reproducing device, such as shown at 90, for instance, in the form of bellows, actuated by lever 20, when said lever is depressed, said bellows being operatively connected to said lever by means of a link, such as 91. It is to be understood that the sound emitted by the bellows will be appropriate to the facial expression produced by the mechanism, so that a gurgling sound, such as babies make at times when laughing can be produced in the case described, or a crying sound may be given off when a crying facial expression is produced.

Figure 11:
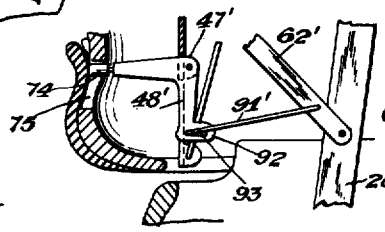
Fig. 11 is a detail, illustrating a modification of the mechanism shown in Figs. 3 and 4.

If desired, the movement imparted to the lower lip, in harmony with the upward movement at the opposite mouth corners, may be caused to begin after such upward movement has started. For instance, the arm 48' of crank lever 47', shown in Fig. 11, used to effect the movements of the lower lip, can have its lower end extended rearwardly, as shown at 92, and provided with a slot 93 for the connection 91' to link 62'. It is obvious that in this manner a time lag will occur between the stretching of the mouth at the corners and the downward movement of the lower lip, the latter beginning to move only when connection 91' reaches the outer end of slot 93. In this manner a slight pressure on lever 20 will produce a faint smile and continued pressure will produce a broad laughing expression.

It is thus seen that I provide a doll having a face normally smooth and placid and of life-like appearance that a child can cause to become animated in a predetermined way, simply by pressing lever 20.

It will be observed that by pivotally suspending said lever 20 from its upper end, a considerable leverage is provided which will entail the necessity on the part of the child of exerting but a small pressure against the lower end of said lever, so that no excessive effort is required for its operation.

Although in practice I prefer to provide a rigid foundation for the flexible face layer, it is to be understood that if desired, the head can be made entirely of rubber or similar material without a separate foundation member, merely by making the portion thereof onto which plate 29 or its equivalent is attached heavy enough to provide the necessary rigidity; the portions of the face which are to be movable being thinned down so as to be possessed of the desired flexibility.

A doll such as described can be made to produce facial expressions which are very natural and attractive, so that a child will derive from it considerable pleasure.

The feature of the lever mechanism for changing the facial expression in the mouth region, in combination with either or both the means for changing the expression of the eyes and the sound device is separately claimed in my divisional application for Letters Patent of the United States, filed September 17, 1934, Serial No. 744,436.

It is obvious that the constructional details of my invention may vary from those shown without departing from the inventive idea; the drawings will therefore, be understood as being intended for illustrative purposes only and not in a limiting sense. I accordingly reserve the right to carry my invention into practice in all those ways and manners which may enter, fairly, into the scope of the appended claims.

I claim:

1. In a doll, a torso, a head composed of a hollow substantially rigid foundation member, and covering therefor having elastic portions adapted to produce variable facial expressions, said foundation member having openings in registry with said elastic portions, lugs permanently attached to said elastic portions extending through said openings, pivotally mounted pushing levers positively connected with said lugs, and means controlled from the torso and operatively connected to said levers, for actuating the same.

2. A doll having a hollow torso and a hollow head of which the face is constituted of material providing an elastic portion surrounding the mouth, pushing lever mechanism located within the head and positively connected with said elastic portion at the opposite mouth corners and at one of the lips, for effecting a composite stretching movement of said elastic portion, involving, sidewise stretching and parting of the lips, and actuating means for said pushing lever mechanism extending into said hollow torso and controlled by pressure on the abdominal region thereof.

3. A doll having a hollow torso and a hollow head of which the face is constituted of material providing an elastic portion surrounding the mouth, pushing lever mechanism located within the head and permanently connected with said elastic portion at the opposite mouth corners and at the lower lip, for effecting a composite stretching movement of said elastic portion involving sidewise stretching and parting of the lips to simulate a smile, and actuating means for said pushing lever mechanism extending into said hollow torso and controlled by pressure thereon.

4. A doll having a hollow head of which the face is constituted of material providing an elastic portion surrounding the mouth, pushing lever mechanism located within the head and positively connected with said elastic portion at points above and below the line of cleavage of the mouth to effect a composite stretching movement of said elastic portion, involving sidewise stretching and parting of the lips, and actuating means for said pushing lever mechanism.

5. A doll having a hollow torso provided with a flexible portion and a hollow head of which the face is constituted of material providing an elastic portion surrounding the mouth, pushing levers located within said head and positively connected with said elastic portion above and below the line of cleavage of the mouth for stretching and parting the lips to change the facial expression of the doll, and actuating means operatively connected with said pushing levers and controlled by pressure on the flexible portion of said torso.

6. A doll having a hollow torso and a hollow head of which the face is constituted of material providing an elastic portion surrounding the mouth, pushing lever mechanism located within the head and positively connected with said elastic portion in the mouth region, for effecting a composite stretching movement thereof, and lever means extending into said hollow torso and controlled by pressure on the abdominal region thereof for actuating said pushing lever mechanism.

7. A doll having a hollow torso and a hollow head of which the face is constituted of material providing an elastic portion surrounding the mouth, pushing lever mechanism located within the head and positively connected with said elastic portion in the mouth region, for effecting a composite stretching movement thereof, and lever means extending into said hollow torso and controlled by pressure thereon for actuating said pushing lever mechanism.

8. A doll having a hollow head of which the face is constituted of material providing an elastic portion surrounding the mouth, pushing lever mechanism located within the head and positively connected with said elastic portion in the mouth region at points above and below the line of cleavage of the mouth for imparting a pushing force to said elastic portion to change the facial expression of the doll, and manually-actuated spring-returned means for operating said pushing lever mechanism.

9. A doll having a hollow head of which the face is constituted of material providing an elastic portion surrounding the mouth, and means for varying the facial expression of said doll, including: a pair of pushing levers located within the head and respectively positively connected with said elastic portion at the opposite mouth corners above the line of cleavage of the mouth, a third pushing lever positively connected with the lower lip and manually-controlled means for actuating said pushing levers in harmony to impart a composite pushing movement to said elastic portion.

10. A doll having a hollow head of which the face is constituted of material providing an elastic portion surrounding the mouth, and means for varying the facial expression of said doll, including: a pair of pushing levers located within the head and respectively positively connected with said elastic portion at the opposite corners on one side of the line of cleavage of the mouth, a third pushing lever positively connected with the lip on the other side of said line of cleavage and manually-controlled means for actuating said pushing levers in harmony to impart a composite pushing movement to said elastic portion.

11. A doll having a hollow head of which the face is constituted of material providing an elastic portion surrounding the mouth, and means for varying the facial expression of said doll, including: a pair of pushing levers located within the head and respectively positively connected with said elastic portion at the opposite mouth corners on one side of the line of cleavage of the mouth, said levers being movable in divergent diagonals with respect to said line of cleavage, a third pushing lever positively connected with the lip on the other side of said line of cleavage, and manually-controlled means for actuating said pushing levers in harmony to impart a composite pushing movement to said elastic portion.

12. A doll having a hollow head of which the face is constituted of material providing an elastic portion surrounding the mouth; and means for varying the facial expression of said doll, including: a pair of pushing levers located within the head and respectively positively connected with said elastic portion at the opposite mouth corners above the line of cleavage of the mouth, said levers being movable in upwardly divergent diagonals with respect to said line of cleavage, a third pushing lever positively connected with the lip below said line of cleavage, and manually-controlled means for actuating said pushing levers in harmony to impart a composite pushing movement to said elastic portion.

13. A doll having a hollow torso provided with a flexible portion and a hollow head of which the face is constituted of material providing an elastic portion surrounding the mouth, and means for varying the facial expression of said doll, including: a pair of pushing levers located within the head and respectively positively connected with said elastic portion at the opposite mouth corners above the line of cleavage of the mouth, said levers being movable in upwardly divergent diagonals with respect to said line of cleavage, a third pushing lever positively connected with the lip below said line of cleavage, and resilient actuating means operatively connected with said pushing levers for moving them in harmony to impart a composite movement to said elastic portion, said resilient actuating means extending into said hollow torso and controlled by pressure on the flexible portion thereof.

14. A doll having a hollow head including a face provided with an elastic portion surrounding the mouth, means for varying the facial expression of the doll including elastic lugs firmly attached to and projecting inwardly from said elastic portion adjacent opposite corners of the mouth, a plurality of levers movable within the head and respectively connected to and cooperable with said lugs at points spaced inwardly from said elastic portion, said lugs resiliently connecting the levers to said elastic portion and the portions of the lugs intervening between the levers and the elastic portion being adapted to be laterally deflected upon operation of the levers, and means for operating the levers.

15. A doll having a hollow head including a face provided with an elastic portion surrounding the mouth, means for varying the facial expression of the doll including a plurality of levers movable within the head and respectively having portions terminating adjacent the mouth in spaced relation to said elastic portion, elastic lugs firmly attached to the elastic portion and respectively connected to and bridging the spaces between the ends of the levers and the portions of the elastic portion adjacent thereto, said lugs respectively affording means yieldingly connecting the levers to the elastic portion and each of said levers being movable so as to displace laterally the opposite ends of the lug cooperable therewith, and means for moving the levers.

CECILIA E. BOWERS.